(12) United States Patent
Tsao et al.

(10) Patent No.: US 7,728,778 B2
(45) Date of Patent: Jun. 1, 2010

(54) PORTABLE ELECTRONIC DEVICE WITH RECEIVER AND ANTENNA

(75) Inventors: Mei-Tsu Tsao, Tu-Cheng (TW); Hung-Chuan Wen, Tu-Cheng (TW)

(73) Assignee: Chi Mei Communication Systems, Inc., Tu-Cheng, Taipei County (TW)

( * ) Notice: Subject to any disclaimer, the term of this patent is extended or adjusted under 35 U.S.C. 154(b) by 165 days.

(21) Appl. No.: 11/952,967

(22) Filed: Dec. 7, 2007

(65) Prior Publication Data
US 2009/0021433 A1 Jan. 22, 2009

(30) Foreign Application Priority Data
Jul. 18, 2007 (CN) .......................... 2007 1 0075207

(51) Int. Cl.
*H01Q 1/24* (2006.01)
(52) U.S. Cl. ...................................... 343/702
(58) Field of Classification Search ................. 343/702, 343/700 MS; 455/575.5, 557
See application file for complete search history.

(56) References Cited
U.S. PATENT DOCUMENTS

| 6,961,022 B1* | 11/2005 | Tay et al. ..................... 343/702 |
| 7,408,514 B2* | 8/2008 | Go ............................. 343/702 |
| 2006/0089184 A1* | 4/2006 | Kim et al. ................ 455/575.5 |

* cited by examiner

*Primary Examiner*—HoangAnh T Le
(74) *Attorney, Agent, or Firm*—Jeffrey T. Knapp

(57) ABSTRACT

A portable electronic device (22) includes a receiver (21), an antenna (25) attached to the receiver, an antenna circuit board (24) electrically connected with the antenna, and a container (26). The receiver has a resonance cavity (2113) defined therein. The antenna circuit board is fixed to the receiver and is used for obturating the resonance cavity. The container is used for receiving the antenna circuit board and the receiver therein.

14 Claims, 3 Drawing Sheets

PORTABLE ELECTRONIC DEVICE WITH RECEIVER AND ANTENNA

BACKGROUND OF THE INVENTION

1. Field of the Invention

The present invention generally relates to portable electronic device, specifically to a portable electronic device having a receiver and an antenna formed therein.

2. Description of Related Art

With the development of wireless communication and information processing technologies, portable electronic devices, such as mobile telephones and personal digital assistants (PDAs), are now in widespread use. These portable electronic devices enable consumers to enjoy high technology services, almost anytime and anywhere.

Such portable electronic device generally includes a receiver and an antenna formed therein. The receiver is used for converting electric signals into useful information. A given receiver defines a resonance cavity therein covered by a board in order to increase intensification and prolongation of sound. The antenna is attached to the receiver and electrically connected with an antenna circuit board for receiving and/or transmitting signals. However, such portable electronic device has a relative complicated structure and a relative large volume.

Therefore, a new portable electronic device is desired in order to overcome the above-described problems.

SUMMARY

In one aspect thereof, a portable electronic device includes a receiver, an antenna attached to the receiver, an antenna circuit board electrically connected to the antenna, and a container. The receiver has a resonance cavity defined therein. The antenna circuit board is fixed to the receiver and is configured for closing the resonance cavity. The container is configured for receiving the antenna circuit board and the receiver therein.

Other advantages and novel features of the embodiments will become more apparent from the following detailed description thereof, when taken in conjunction with the accompanying drawings.

BRIEF DESCRIPTION OF THE DRAWINGS

Many aspects of the present portable electronic device can be better understood with reference to the following drawings. The components in the drawings are not necessarily drawn to scale, the emphasis instead being placed upon clearly illustrating the principles of the present portable electronic device and its potential applications. Moreover, in the drawings, like reference numerals designate corresponding parts throughout the several views, in which.

DETAILED DESCRIPTION OF THE EMBODIMENTS

Figure 1:
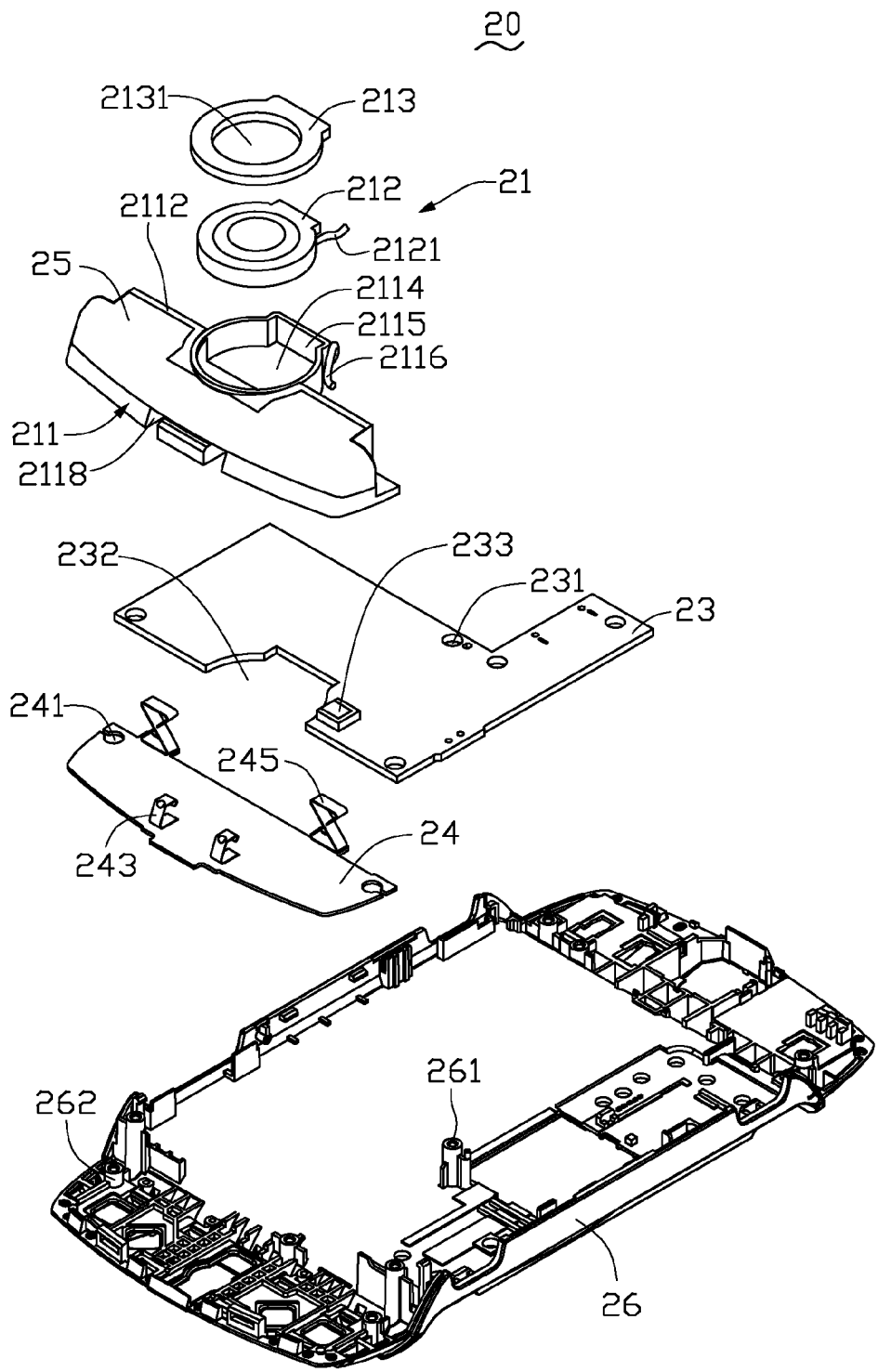
FIG. 1 is an exploded, isometric view of a portable electronic device, in accordance with a present embodiment.

Referring to the drawings in detail, FIG. 1 shows a portable electronic device 20 in accordance with a present embodiment. The portable electronic device 20 includes a receiver 21, an antenna 25 attached to the receiver 21, a main circuit board 23, an antenna circuit board 24 electrically connected to the antenna 25 and the main circuit board 23, and a container 26 configured (i.e., structured and arranged) for receiving the receiver 21, the antenna 25, the main circuit board 23, and the antenna circuit board 24.

Figure 2:
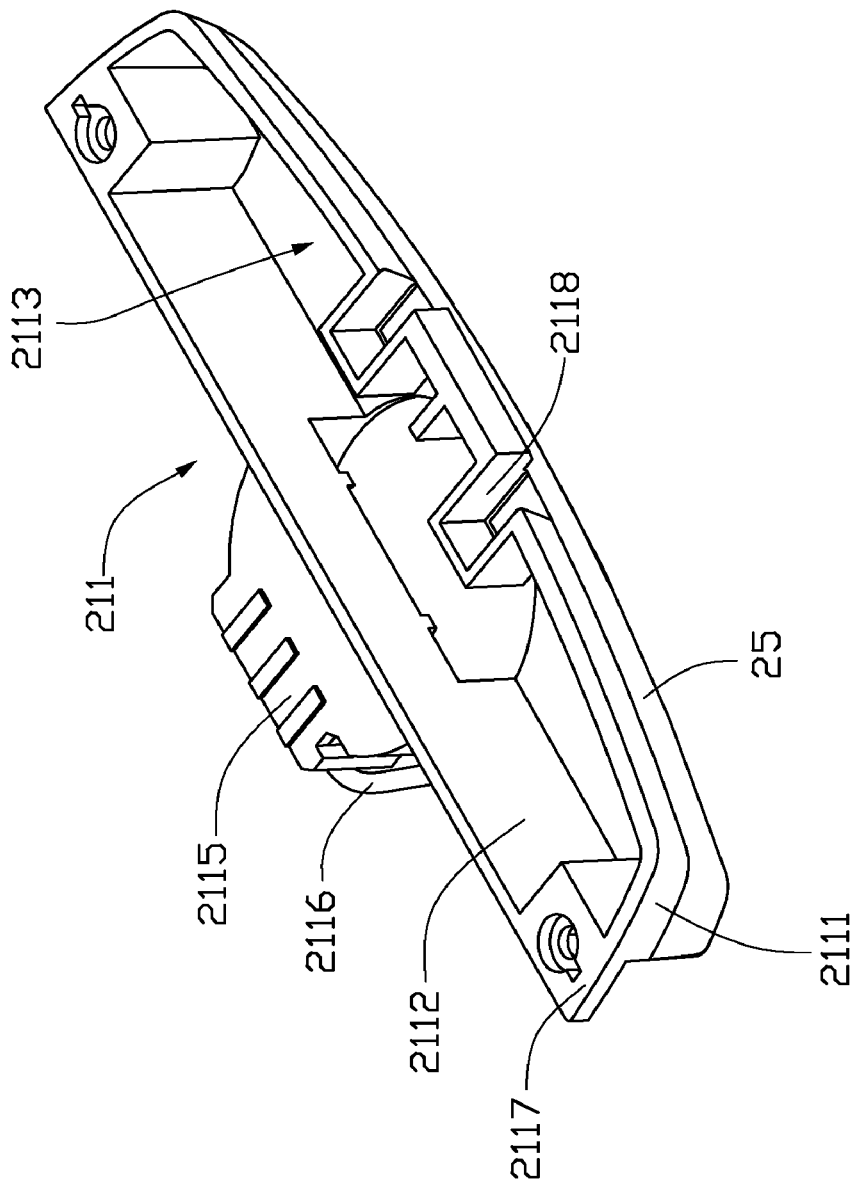
FIG. 2 is an assembled, isometric view of a receiver and an antenna of the portable electronic device shown in FIG. 1, viewed from another aspect.

Also referring to FIG. 2, the receiver 21 includes a housing 211, an electro-acoustic transducer 212 received in the housing 211, and a cover 213 partially covering the housing 211. The housing 211 has a bent wall 2111 and a planar wall 2112 cooperating to define a resonance cavity 2113 which has an open end exposing to outside. A cylindrical receiving portion 2115 is provided at a center of a joint edge of the bent wall 2111 and the planar wall 2112. The receiving portion 2115 has a closed end and an opposite open end, and defines a receiving cavity 2114 therein along an axial direction. The receiving cavity 2114 communicates with the resonance cavity 2113. A tube 2116 is formed on a peripheral wall of the receiving portion 2115. At least one block 2117 extends outwardly from one end of the planar wall 2112. In the present embodiment, there are two blocks 2117 extend outwardly respectively from two distal ends of the planar wall 2112. Each block 2117 defines a screw hole therein. The bent wall 2111 is recessed towards the planar wall 2112 to form at least one substantially U-shaped recess 2118. In the present embodiment, there are two recesses 2118 provided at a central portion of the bent wall 2111.

The electro-acoustic transducer 212 is used for converting electric signals into sounds and is configured for being receivable in the receiving cavity 2114 of the housing 211. The electro-acoustic transducer 212 is cylindrical and has an electric contact 2121 formed at a peripheral wall thereof. The electric contact 2121 is configured for being receivable in the tube 2116 of the housing 211. The cover 213 is a substantially round ring in shape and defines a central hole 2131 therethrough. The cover 213 is configured for covering the open end of the receiving portion 2115 of the housing 211.

The antenna 25 is a thin film formed on an outer surface of the bent wall 2111 and is configured for receiving or transmitting signals of the portable electronic device 20.

The main circuit board 23 is a printed circuit board (PCB), and defines at least one fixing hole 231 therethrough and a cutout 232 through one end thereof. In the present embodiment, there are three fixing holes 231. The cutout 232 is configured for receiving the receiving portion 2115 of the receiver 21. The main circuit board 23 has a top surface formed with a top contact 233 configured for electrically connecting with the electric contact 2121 thereby electrically connecting the electro-acoustic transducer 212 to the main circuit board 23 and a bottom surface formed with two bottom contact (not shown).

The antenna circuit board 24 is a printed circuit board and defines at least one mounting hole 241 therein. In the present embodiment, there are two mounting holes 241. The two mounting holes 241 respectively correspond to the two screw holes of the housing 211. At least one substantially C-shaped first connector 243 is formed at one edge of the antenna circuit board 24. In the present embodiment, there are two first connectors 243. The first connectors 243 are configured for engaging with a corresponding recess 2118 thereby electrically connecting the antenna 25 with the antenna circuit board 24 and mounting the receiver 21 to the antenna circuit board 24. At least one second connector 245 is formed at the other edge of the antenna circuit board 24. In the present embodiment, there are two second connectors 245. Each second connector 245 is configured for connecting a corresponding bottom contact of the main circuit board 23 thereby electrically connecting the antenna circuit board 24 with the main circuit board 23.

The container 26 is a housing of the portable electronic device 20. At least one fixing pole 261 is formed on the container 26. In the present embodiment, there are three fixing poles 261. Each fixing pole 261 defines a screw hole therein and is configured for engaging with a corresponding fixing hole 231 of the main circuit board 23 thereby mounting the main circuit board 23 to the container 26 by a bolt. At least one mounting pole 262 is formed on the container 26. In the present embodiment, there are two mounting poles 262. Each mounting pole 262 defines a screw hole therein and is configured for engaging with a corresponding mounting hole 241 of the antenna circuit board 24 and a corresponding screw hole of the housing 211 thereby mounting the receiver 21 and the antenna circuit board 24 to the container 26 by a bolt.

In assembly, the antenna 25 is attached on the housing 211. The electro-acoustic transducer 212 is inserted into the receiving cavity 2114. The electric contact 2121 is received in the tube 2116 of the housing 211 and a distal end of the electric contact 2121 is exposed out from the tube 2116. The cover 213 is mounted to the open end of the receiving portion 2115 thereby securing the electro-acoustic transducer 212 in the receiving cavity 2114. Each first connector 243 engages with a corresponding protrusion 2118 thereby electrically connecting the antenna 25 to the antenna circuit board 24 and mounting the receiver 21 to the antenna circuit board 24. Thus the receiver 21 with the antenna 25 and the antenna circuit board 24 are assembled. The antenna circuit board 24 obturates the open end of the housing 211. The resonance cavity 2113 can increase intensification and prolongation of sound.

Figure 3:
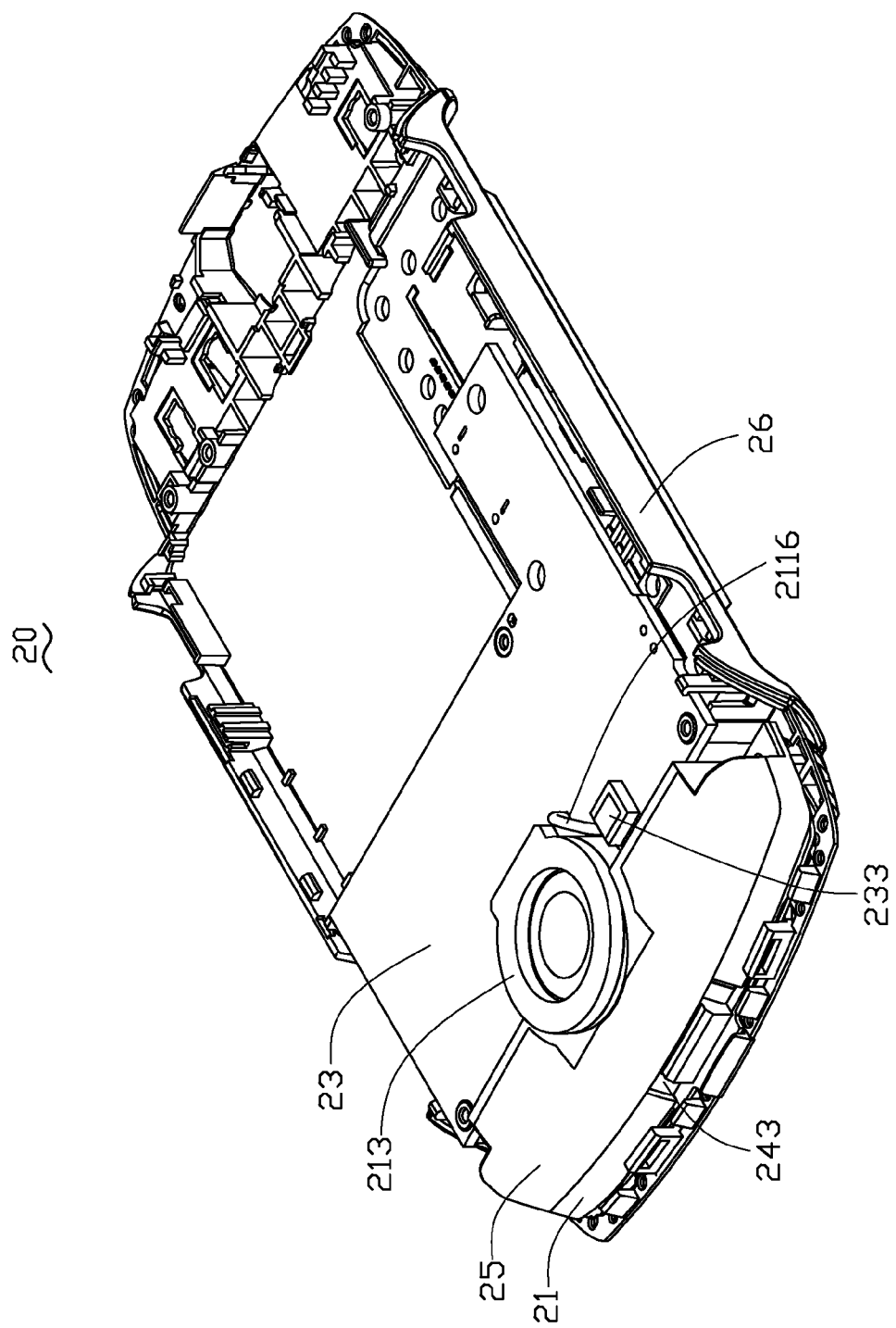
FIG. 3 is an assembled, isometric view of the portable electronic device shown in FIG. 1.

The assembled receiver 21 and the antenna circuit board 24 are received in the container 26 by fixing two bolts respectively into the two screw holes of the housing 211, the two mounting holes 241, and the two screw holes of the mounting poles 262. The main circuit board 23 is received in the container 26 by fixing three bolts respectively into the three fixing holes 231 and the three screw holes of the fixing poles 261. Each second connector 245 engages with a corresponding bottom contact of the main circuit board 23 thereby electrically connecting the antenna circuit board 24 to the main circuit board 23. The exposed end of the electric contact 2121 is connected to the top contact 233 thereby electrically connecting the electro-acoustic transducer 212 to the main circuit board 23. Thus the portable electronic device 20 is completely assembled, as represented in FIG. 3.

It should be understood that the antenna 25 may be alternatively provided on an outer surface of the planar wall 2112.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A portable electronic device, comprising:
   a receiver having a bent wall and a planar wall cooperating to define a resonance cavity therein, the bent wall being recessed towards the planar wall to form a recess;
   an antenna attached to the receiver;
   an antenna circuit board electrically connected to the antenna, the antenna circuit board being fixed to the receiver and being configured for covering the resonance cavity, the antenna circuit board having a connector, and the antenna circuit board is fixed to the receiver by engaging the connector to the recess; and
   a container configured for receiving the antenna circuit board and the receiver therein.

2. The portable electronic device as claimed in claim 1, wherein the antenna is a thin film attached on an outer surface of one of the bent wall and the planar wall.

3. The portable electronic device as claimed in claim 1, wherein the receiver further has a receiving portion formed at a corner of the bent wall and the planar wall, and the receiving portion defines a receiving cavity communicating with the resonance cavity and configured for receiving an electro-acoustic transducer therein.

4. The portable electronic device as claimed in claim 3, further comprising a main circuit board electrically connected to the electro-acoustic transducer and the antenna circuit board, and defining a cutout therein configured for receiving the receiving portion of the receiver.

5. The portable electronic device as claimed in claim 1, wherein the recess of the bent wall is substantially U-shaped.

6. The portable electronic device as claimed in claim 1, wherein the connector of the antenna circuit board is substantially C-shaped.

7. A receiver module, comprising:
   a receiver having a resonance cavity defined therein;
   an antenna attached to the receiver;
   an antenna circuit board electrically connected with the antenna, the antenna circuit board being fixed to the receiver and being configured for covering the resonance cavity; and
   a main circuit board electrically connected to the antenna circuit board.

8. The receiver module as claimed in claim 7, wherein the receiver has a bent wall and a planar wall cooperating to define the resonance cavity.

9. The receiver module as claimed in claim 8, wherein the antenna is a thin film attached on an outer surface of one of the bent wall and the planar wall.

10. The receiver module as claimed in claim 8, wherein the receiver further has a receiving portion provided at an joint edge of the bent wall and the planar wall, and the receiving portion defines a receiving cavity communicating with the resonance cavity and configured for receiving an electro-acoustic transducer therein.

11. The receiver module as claimed in claim 8, wherein the bent wall of the receiver is recessed towards the planar wall to form a recess, the antenna circuit board has a connector, and the antenna circuit board is fixed to the receiver by engaging the connector to the recess.

12. The receiver module as claimed in claim 11, wherein the recess of the bent wall is substantially U-shape.

13. The receiver module as claimed in claim 11, wherein the connector of the antenna circuit board is substantially C-shape.

14. The receiver module as claimed in claim 7, wherein the main circuit board defines a cutout therein configured for receiving the receiver.

* * * * *